United States Patent
Nagarajan et al.

(10) Patent No.: US 9,782,322 B2
(45) Date of Patent: Oct. 10, 2017

(54) RESISTIVE EXOSKELETON CONTROL DESIGN FRAMEWORK

(71) Applicant: Honda Motor Co., Ltd., Minato-ku, Tokyo (JP)

(72) Inventors: Umashankar Nagarajan, Tamil Nadu (IN); Ambarish Goswami, Fremont, CA (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/801,455

(22) Filed: Jul. 16, 2015

(65) Prior Publication Data

US 2017/0014296 A1    Jan. 19, 2017

(51) Int. Cl.
 *B25J 9/16* (2006.01)
 *A63B 23/035* (2006.01)
 (Continued)

(52) U.S. Cl.
 CPC .............. *A61H 3/00* (2013.01); *B25J 9/1633* (2013.01); *A63B 21/00178* (2013.01); *A63B 21/00181* (2013.01); *A63B 21/068* (2013.01); *A63B 21/15* (2013.01); *A63B 21/4007* (2015.10); *A63B 21/4009* (2015.10); *A63B 21/4011* (2015.10); *A63B 21/4015* (2015.10);
 (Continued)

(58) Field of Classification Search
 CPC .................. B25J 9/0006; B25J 9/1633; A61F 2002/5033; A61F 2002/701; A61F 2002/704; A61F 2002/741; A61F 2002/503; A61F 2002/5036; A61H 3/00; A61H 3/008; A61H 2003/007; A61H 2201/50; A61H 2201/1657; A61H 2201/1659; A61H 2201/165; A61H 2201/5007; A61H 2201/5061; A61H 2201/5064; A61H 2201/5058; A61H 1/0237; A61H 1/024; A61H 1/0262; A61H 1/0244; A63B 2024/0093; A63B 23/035; A63B 23/0494; A63B 21/4025; G05B 2219/36429; G05B 2219/39345; G05B 2219/40305
 See application file for complete search history.

(56) References Cited

U.S. PATENT DOCUMENTS 7,252,644 B2    8/2007   Dewald et al.
7,774,177 B2    8/2010   Dariush
(Continued)

FOREIGN PATENT DOCUMENTS

WO       2014109799       7/2014

OTHER PUBLICATIONS

Carignan et al., Controlling Shoulder Impedance in a Rehabilitation Arm Exoskeleton, May 2008, IEEE International Conference on Robotics and Automation, pp. 2453-2458.*
(Continued)

*Primary Examiner* — Spencer Patton
(74) *Attorney, Agent, or Firm* — Arent Fox LLP (57) ABSTRACT

A resistive exoskeleton control system has a controller generating a positive resistance by shaping a closed loop integral admittance of a coupled human exoskeleton system wherein a frequency response magnitude of the integral admittance is lower than that of a natural human joint for desired frequencies of interest and generating an assistance ratio of approximately zero for the desired frequencies of interest.

17 Claims, 7 Drawing Sheets

(51) Int. Cl.
*A61H 3/00* (2006.01)
*A63B 21/068* (2006.01)
*A63B 21/00* (2006.01)
*A63B 23/04* (2006.01)
*A63B 24/00* (2006.01)
*A63B 71/00* (2006.01)

(52) U.S. Cl.
CPC ....... *A63B 21/4033* (2015.10); *A63B 21/4047* (2015.10); *A63B 23/03541* (2013.01); *A63B 23/0405* (2013.01); *A63B 24/0087* (2013.01); *A63B 2071/0063* (2013.01); *G05B 2219/39343* (2013.01)

(56) References Cited

U.S. PATENT DOCUMENTS

| | | |
|---|---|---|
| 8,070,700 B2 | 12/2011 | Kazerooni et al. |
| 8,171,570 B2 | 5/2012 | Adarraga |
| 2012/0259431 A1 | 10/2012 | Han et al. |
| 2012/0330198 A1 | 12/2012 | Patoglu |
| 2013/0040783 A1 | 2/2013 | Duda et al. |
| 2014/0081421 A1 | 3/2014 | Herr et al. |
| 2014/0100493 A1 | 4/2014 | Craig et al. |
| 2014/0213951 A1 | 7/2014 | Pietrusisnki et al. |
| 2014/0277739 A1 | 9/2014 | Kornbluh et al. |

OTHER PUBLICATIONS

Colgate et al., "An Analysis of Contact Instability in Terms of Passive Physical Equivalents," May 1989, IEEE International Conference on Robotics and Automation, pp. 404-409.*
Guwahati, "Process Control and Instrumentation," Jun. 2013, NPTEL, Module 4: Feedback controller, Lecture 10: Gain Margin and Phase Margin, http://nptel.ac.in/courses/103103037/26.*
Bao et al., "Process Control: The Passive Systems Approach," 2007, Springer-Verlag.*
Moheimani et al., "Mechatronic Systems 2004," "Negative Inductor-Resistor Controller for Electromagnetic Shunt Damping," 2004, 3rd IFAC Symposium, Elsevier, p. 431.*
Buerger, S.P., "Stable, high-force, low-impedance robotic actuators for human-interactive machines," Ph.D. dissertation, Massachusetts Institute of Technology, Cambridge, MA, 2005.
Buerger, S.P., et. al., Complementary stability and loop shaping for improved human-robot interaction, IEEE Trans. Robotics, vol. 23, No. 2, pp. 232-244, 2007.
Burdet, E., et. al., "The central nervous system stabilizes unstable dynamics by learning optimal impedance," Nature, vol. 414, No. 6862, pp. 446-449, 2001.
Canet, P., Kalman filter estimation of angular velocity and acceleration: On-line implementation, McGill University, Montr'eal, Canada, Tech. Rep. TR-CIM-94-15, Nov. 1994.
Colgate, J.E., "The control of dynamically interacting systems," Ph.D. dissertation, Massachusetts Institute of Technology, Cambridge, MA, 1988.
Colgate, J.E., et. al., "An analysis of contact instability in terms of passive physical equivalents," in Proc. IEEE Int. Conf. Robotics and Automation (ICRA), pp. 404-409, 1989.
Dijk, W., et. al., "A passive exoskeleton with artificial tendons: Design and experimental evaluation," in Proc. IEEE Int. Conf. Rehabilitation Robotics (ICORR), pp. 1-6, 2011.
Doke, J., et. al., "Mechanics and energetics of swinging the human leg," Journal of Experimental Biology, vol. 208, pp. 439-445, 2005.
Dollar, A.M. et. al., "Lower extremity exoskeletons and active orthoses: Challenges and state-of-the-art," IEEE Trans. Robotics, vol. 24, No. 1, pp. 144-158, 2008.
Farris, D.J., et. al., "Linking the mechanics and energetics of hopping with elastic ankle exoskeletons," J. Appl. Physiol., vol. 113, No. 12, pp. 1862-1872, 2012.
Farris, R., et. al., "Preliminary evaluation of a powered lower limb orthosis to aid walking in paraplegic individuals," IEEE Trans. Neural Syst. Rehabil. Eng., vol. 19, No. 6, pp. 652-659, 2011.
Ferris, D., et. al. "A physiologist's perspective on robotic exoskeletons for human locomotion," Int. J. Humanoid Robots, vol. 4, No. 3, pp. 507-528, 2007.
Ferris, D.P., "An ankle-foot orthosis powered by artificial pneumatic muscles," J. Appl. Biomech., vol. 21, No. 2, pp. 189-197, 2005.
Ferris, D.P., The exoskeletons are here, Journal of Neuroengineering and Rehabilitation, vol. 6, No. 17, pp. 1-3, 2009.
Frisoli, A., et. al. A new force-feedback arm exoskeleton for haptic interaction in virtual environments, in Proc. World Haptics Conf., IEEE Computer Society,pp. 195-201, 2005.
Gopura, R.A.R.C., et. al., "A brief review on upper extremity robotic exoskeleton systems," in Proc. IEEE Int. Conf. Industrial and Information Systems (ICIIS), pp. 346-351, 2011.
Gopura, R.A.R.C., Sueful-7: A 7-dof upper limb exoskeleton robot with muscle-model-oriented emg-based control, in Proc. IEEE/RSJ Int. Conf. Intelligent Robots and Systems (IROS), pp. 1126-1131, 2009.
Grabowski, A.M., et. al., "Leg exoskeleton reduces themetabolic cost of human hopping," J. Appl. Physiol., vol. 107, No. 3, pp. 670-678, 2009.
Gupta., A., et. al. "Design of a haptic arm exoskeleton for training and rehabilitation," IEEE/ASME Trans. Mechatronics, vol. 11, No. 3, pp. 280-289, 2006.
Hayes, K.C, et. al., Passive visco-elastic properties of the structures spanning the human elbow joint, European Journal Applied Physiology, vol. 37, pp. 265-274, 1977.
Herr, H.M., et. al., "Bionic ankle-foot prosthesis normalizes walking gait for persons with leg amputation," Proc. Biol. Sci., The Royal Society, vol. 279, No. 1728, pp. 457-464, 2012.
Hitt, J.K., et. al., "An active foot ankle prosthesis with biomechanical energy regeneration," Journal of Medical Devices, vol. 4, No. 1, p. 011003011011, 2010.
Hogan, N., "Impedance control: An approach to manipulation," in Proc. American Control Conference, pp. 304-313,1984.
Hogan, N., et. al., Impedance and Interaction Control, Robotics and Automation Handbook. CRC Press, LLC., ch. 19., 2005.
Huang., G.T., "Wearable robots," Technol. Rev., pp. 70-73, Jul./Aug. 2004.
Kawamoto, H., et. al., "Power assist system hal-3 for gait disorder person," in Proc. Int. Conf. Comput. Helping People Special Needs (ICCHP), pp. 196-203, 2002.
Kazerooni, H., "Berkeley lower extremity exoskeleton," ASME J. Dyn. Syst., Meas., Control, vol. 128, pp. 14-25, 2006.
Kiguchi, K., "An exoskeletal robot for human shoulder joint motion assist," IEEE/ASME Trans. Mechatronics, vol. 8, No. 1, pp. 125-135, 2003.
Koyama, T., et. al., Multi-fingered exoskeleton haptic device using passive force feedback for dexterous teleoperation, in Proc. IEEE/RSJ Int. Conf. Intelligent Robots and Systems (IROS), pp. 2905-2910, 2002.
Malcolm, P. et. al., "A simple exoskeleton that assists plantarflexion can reduce the metabolic cost of human walking," PLoS One, vol. 8, No. 2, p. e56137, 2013.
Marcheschi, S., "Body Extender: Whole body exoskeleton for human power augmentation," in Proc. IEEE Int. Conf. Robotics and Automation (ICRA), pp. 611-616, 2011.
Mooney, L.M., "Autonomous exoskeleton reduces metabolic cost of human walking during load carriage," Journal of Neuroengineering and Rehabilitation, vol. 11, No. 80, 2014.
Nelder, J., et. al., "A simplex method for function minimization," The Computer Journal, vol. 7, pp. 308-313, 1964.
Ollinger, G.A., et. al., "A one-degree-of-freedom assistive exoskeleton with inertia compensation: the effects on the agility of leg swing motion," Proc. Inst. Mech. Eng. H., vol. 225, No. 3, pp. 228-245, 2011.
Ollinger, G.A., et. al., "Activeimpedance control of a lower-limb assistive exoskeleton," in Proc. IEEE Int. Conf. Rehabil. Robot. (ICORR), pp. 188-195, 2007.

(56) References Cited

OTHER PUBLICATIONS

Ollinger, G.A., et. al., "Inertia compensation control of a one-degree-of-freedom exoskeleton for lower-limb assistance: Initial experiments," IEEE Trans. Neural Syst. Rehabil. Eng., vol. 20, No. 1, pp. 68-77, 2012.

Ollinger, G.A., et. al., A 1- DOF assistive exoskeleton with virtual negative damping: Effects on the kinematic response of the lower limbs, in Proc. IEEE Int. Conf. Intelligent Robots and Systems (IROS), pp. 1938-1944, 2007.

Ollinger, Gabriel, et. al., Design of an active one-degree-of-freedom lower-limb exoskeleton with inertia compensation, Int. J. Robotics Research, vol. 30, No. 4, pp. 486-499, 2011.

Pehlivan, A.U., et. al., "Mechanical design of a distal arm exoskeleton for stroke and spinal cord injury rehabilitation," in Proc. IEEE Int'l. Conf. Rehabilitation Robotics, 2011.

Perry., J., "Upper-limb powered exoskeleton design," IEEE/ASME Trans. Mechatronics, vol. 12, No. 4, pp. 408-417, 2007.

Pratt, J.E., et. al., The RoboKnee: An exoskeleton for enhancing strength and endurance during walking, in Proc. IEEE Int. Conf. Robotics and Automation (ICRA), pp. 2430-2435, 2004.

Sawicki, G.S., et. al. "Mechanics and energetics of level walking with powered ankle exoskeletons," J. Exp. Biol., vol. 211, No. Pt. 9, pp. 1402-1413, 2008.

Sukuki, K., et. al., Intention-based walking support for paraplegia patients with robot suit hal, Advanced Robot., vol. 21, pp. 1441-1469, 2007.

Tsagarakis, N.G., et. al., "Development and control of a 'soft-actuated' exoskeleton for use in physiotherapy and training," Autonomous Robots, vol. 15, No. 1, pp. 21-23, 2003.

Tsukahara, A., et. al., "Sit-to-stand and stand-to-sit transfer support for complete paraplegic patients with robot suit hal," Advanced Robot., vol. 24, pp. 1615-1638, 2010.

Versluys, R., et. al., "Successful preliminary walking experiments on a transtibial amputee fitted with a powered prosthesis," Prosthetics and Orthotics International, vol. 33, No. 4, pp. 368-377, 2009.

Walsh, C.J., et. al., "A quasi-passive leg exoskeleton for load-carrying augmentation," Int. J. Humanoid Robotics, vol. 4, No. 3, pp. 487-506, 2007.

Winter, D.A., Biomechanics and Motor Control of Human Movement (4th Edition). Wiley, p. 86., 2009.

\* cited by examiner

RESISTIVE EXOSKELETON CONTROL DESIGN FRAMEWORK

TECHNICAL FIELD

The present application generally relates to exoskeletons, and, more particularly, to a control design framework for designing exoskeleton controllers that resist human motion resulting in motion reduction and torque amplification.

BACKGROUND

Exoskeletons are wearable mechanical devices that may possess a kinematic configuration similar to that of the human body and that may have the ability to follow the movements of the user's extremities. Powered exoskeletons may be designed to produce contact forces to assist the user in performing a motor task. In the past, a majority of the research on exoskeletons generally has focused on providing assistance to human limbs, where the assistance may potentially allow humans to carry loads with less effort (H. Kazerooni and R. Steger, "Berkeley lower extremity exoskeleton," ASME J. Dyn. Syst., Meas., Control, vol. 128, pp. 14-25. 2006) and (L. M. Mooney, E. I. Rouse, and H. M. Herr, "Autonomous exoskeleton reduces metabolic cost of human walking during load carriage," Journal of Neuroengineering and Rehabilitation, vol, 11, no. 80. 2014); walk faster (S. Lee and Y. Sankai, "Virtual impedance adjustment in unconstrained motion for an exoskeletal robot assisting the lower limb," Advanced Robotics, vol. 19, no. 7, pp. 773-795, 2005) and (G. S. Sawicki and D. P. Ferris, "Mechanics and energetics of level walking with powered ankle exoskeletons," J. Exp. Biol., vol. 211, no. Pt. 9, pp. 1402-1413, 2008) and provide torque assist to joints (J. E. Pratt, B. T. Krupp, C. J. Morse, and S. H. Collins, "The RoboKnee: An exoskeleton for enhancing strength and endurance during walking," in Proc. IEEE Int. Conf. Robotics and Automation (ICRA), 2004, pp. 2430-2435) and (K. E. Gordon, C. R. Kinnaird, and D. P. Ferris, "Locomotor adaptation to a soleus emg-controlled antagonistic exoskeleton," J. Neurophysiol., vol. 109, no. 7, pp. 1804-1814, 2013.).

Exoskeletons may be used to provide resistance to human motion. By providing resistance to human motion, the exoskeletons may be used for exercise and rehabilitation applications. Resistance training with upper body exoskeletons has been used in the past. (Z. Song and Z. Wang, "Study on resistance training for upper-limb rehabilitation using an exoskeleton device," in Proc. IEEE Int'l Conf. Mechatronics and Automation, 2013, pp. 932-938); (Z. Song, S. Guo, M. Pang, S. Zhang, N. Xiao, B. Gao, and L. Shi, "Implementation of resistance training using an upper-limb exoskeleton rehabilitation device for elbow joint," J. Med. Bio. Engg., vol. 34, no. 2, pp. 188-196, 2014) and (T.-M. Wu and D.-Z. Chen, "Biomechanical study of upper-limb exoskeleton for resistance training with three-dimensional motion analysis system," J. Rehabil. Res. Dev., vol. 51, no. 1, pp. 111-126, 2014.). Upper body exoskeletons that may resist human motion with applications to tremor suppression have been used for rehabilitation (E. Rocon and J. L. Pons, Exoskeletons in Rehabilitation Robotics:Tremor Suppression. Springer Tracts in Advanced Robotics, 2011, pp. 67-98.). In 2013, NASA introduced the X1 exoskeleton ((2013) Nasa's x1 exoskeleton. http://www.nasa.gov/offices/oct/home/feature_exoskeleton.html). The X1 exoskeleton may be capable of providing both assistance and resistance to the joints in the leg. The X1 exoskeleton may be used as an exercise device that may improve the health of astronauts during their time in space, and may also be used for rehabilitation applications.

Even with previous efforts in exoskeleton design and implementation, there continues to be a need for a resistive exoskeleton control design framework that provides exoskeleton control parameters that achieve desired resistance. Therefore, it would be desirable to provide a system and method that overcome the above. The system and method would provide a resistive exoskeleton control design framework that provides exoskeleton control parameters that achieve desired resistance while ensuring that the resulting coupled system dynamics are both stable and passive.

SUMMARY

In accordance with one embodiment, a resistive exoskeleton control system is disclosed. The control system has a controller shaping a closed loop integral admittance of a coupled human exoskeleton system wherein a frequency response magnitude of the integral admittance is lower than that of a natural human joint for desired frequencies of interest and generating an assistance ratio of approximately zero over the desired frequencies of interest.

In accordance with one embodiment, a resistive exoskeleton control system is disclosed. The resistive exoskeleton control system has a controller shaping a closed loop integral admittance of a coupled human exoskeleton system wherein a frequency response magnitude of the integral admittance is lower than that of a natural human joint and generating an assistance ratio of approximately zero for desired frequencies of interest, wherein the controller being stable and passive.

In accordance with one embodiment, an exoskeleton control system is disclosed. The exoskeleton control system has a controller generating a positive resistance and approximately zero assistance by shaping a closed loop integral admittance of a coupled human exoskeleton system over a desired frequency range, wherein the controller being stable and passive.

BRIEF DESCRIPTION OF THE DRAWINGS

In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein.

DESCRIPTION OF THE INVENTION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Embodiments of the disclosure provide a control design framework for designing resistive exoskeleton controllers that may resist human joint motion. Resistance in regards to exoskeleton controllers may be defined as the decreasing of the frequency response magnitude profile of the integral admittance of the coupled human-exoskeleton system below that of the normal human limb. An exoskeleton controller may be resistive if the controller increases the impedance and decreases the admittance of the coupled human-exoskeleton joint. A resistive exoskeleton controller may result in motion reduction, i.e., the joint motion amplitude may be lower for the same joint torque profile, and torque amplification, i.e., the joint torque amplitude required to achieve the same joint motion may be larger.

The present control design framework may modify the coupled system joint dynamics such that system admittance may be decreased. More precisely, the coupled joint dynamics may be characterized by the frequency response magnitude profile of the coupled system integral admittance (torque-to-angle relationship), and resistance may be achieved when the frequency response magnitude profile of the integral admittance of the coupled system may be lower than that of the natural human joint for all frequencies of interest. The resistive control design framework may provide exoskeleton control parameters that may ensure that the coupled system is stable and passive while achieving the desired resistance. The present control design framework may be formulated as a constrained optimization problem, with the objective of finding exoskeleton control parameters that achieve a desired resistance while satisfying coupled stability and passivity constraints.

The present control design framework may provide resistive exoskeletons that may be used in rehabilitation applications for resistance training, and may be used by non-pathological humans for physical exercises and muscle building. Embodiments of the control design framework may allow a single exoskeleton device to emulate different physical training conditions with increased weight, increased damping (walking in sand or water), increased stiffness (walking uphill), and any combinations thereof. Therefore, instead of moving to different conditions or locations for physical training, a human subject may use a single device to emulate the different conditions in a single location of their choosing.

Embodiments of the control design framework may be modified to design exoskeleton controllers that provide assistance and avoid resistance. The controllers that assist at some frequencies and resist at some other frequencies may also be designed using the disclosed framework. The shape of the response curve of the integral admittance of the disclosed coupled system may be shaped to achieve a variety of different desired dynamic responses for the human limb.

It should be noted that while a framework for a one degree-of-freedom (1-DOF) exoskeleton is disclosed herein, embodiments of the novel framework may be extended to multiple degrees-of-freedom (DOF) exoskeletons. The disclosed framework is not limited to lower-limb exoskeletons and may be extended to upper-limb exoskeletons, as well as whole body exoskeleton devices with resistive controllers at each joint that may help in physical training for the whole body. The disclosed framework may be extended to task-level resistance instead of joint-level resistance. For example, the exoskeleton controllers may be designed to resist the motion of the foot (task-level output) rather than resist the hip, knee and ankle (joint-level outputs) joint motions.

The system parameters of the coupled human-exoskeleton system used in the analysis and experimental results presented in the exemplary embodiments of the disclosure may be seen in Table 1 shown below. The human limb data corresponds to the leg of a human whose weight may be approximately 65 kg and height approximately 1.65 m. In the exemplary embodiments of the disclosure, the knee may be assumed to be locked and all parameters may be computed for the hip joint. The moment of inertia $I_h$ may be obtained from Cadaver data provided in "Biomechanics and Motor Control of Human Movement" by D. A. Winter (4$^{th}$ Edition, Wiley, 2009, p. 86), and may be scaled to the human weight and height. The joint damping coefficient may be taken from "Passive visco-elastic properties of the structures spanning the human elbow joint," by K. C. Hayes and H. Hatze (European Journal Applied Physiology, vol. 37, pp. 265-274, 1977), and the joint stiffness coefficient may be obtained using $k_h = I_h \omega^2_{nh}$ where the natural frequency $\omega_{nh}$ may be obtained from "Mechanics and energetics of swinging the human leg" by J. Doke, J. M. Donelan, and A. D. Kuo (Journal of Experimental Biology, vol. 208, pp. 439-445, 2005).

TABLE 1

COUPLED HUMAN-EXOSKELETON SYSTEM PARAMETERS

| Parameters | Symbol | Value |
|---|---|---|
| Human Leg Mass (locked knee) | $m_h$ | 10.465 kg |
| Human Leg Length | $l_h$ | 0.875 m |
| Human Leg Moment of Inertia | $I_h$ | 3.381 kg·m² |
| Human Hip Joint Damping Coefficient | $b_h$ | 3.5 N·m·s/rad |
| Human Hip Joint Stiffness Coefficient | $k_h$ | 54.677 N·m/rad |
| Human Leg Natural Angular Frequency | $\omega_{nh}$ | 4.021 rad/s |
| Exoskeleton Arm Moment of Inertia | $I_e$ | 0.01178 kg·m² |
| Exoskeleton Joint Damping Coefficient | $b_e$ | 0.34512 N·m·s/rad |
| Exoskeleton Joint Stiffness Coefficient | $k_e$ | 0.33895 N·m/rad |
| Coupling Damping Coefficient | $b_c$ | 9.474 N·m·s/rad |
| Coupling Stiffness Coefficient | $k_c$ | 1905.043 N·m/rad |

The exoskeleton parameters listed in Table 1 may be obtained from system identification experiments on a 1-DOF hip exoskeleton shown in FIG. 1, which is described in greater detail below. The coupling parameters listed in Table 1 may be obtained with the assumption that the coupling parameters second-order dynamics with the exoskeleton inertia $I_e$ may have a damping ratio $\zeta_c=1$ and natural frequency $\omega_{nc}=100\,\omega_{nh}$, where $\omega_{nh}$ is the natural frequency of the human limb.

Figure 1:
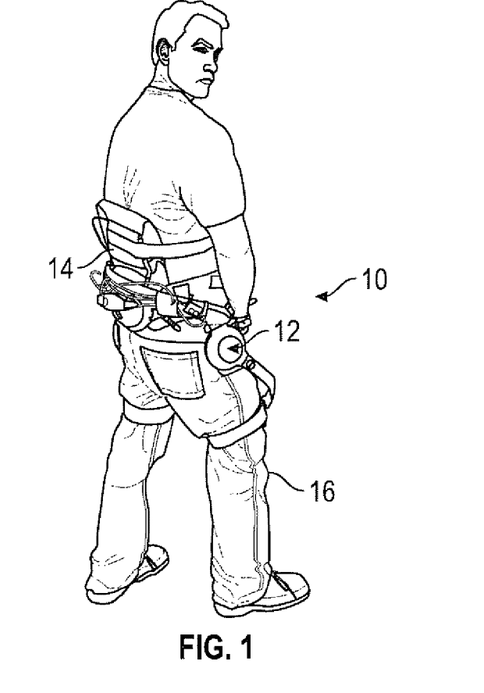
FIG. 1 is a perspective view of an exoskeleton device implementing an exemplary admittance shaping controller in accordance with one aspect of the present application.
Figure 2A:
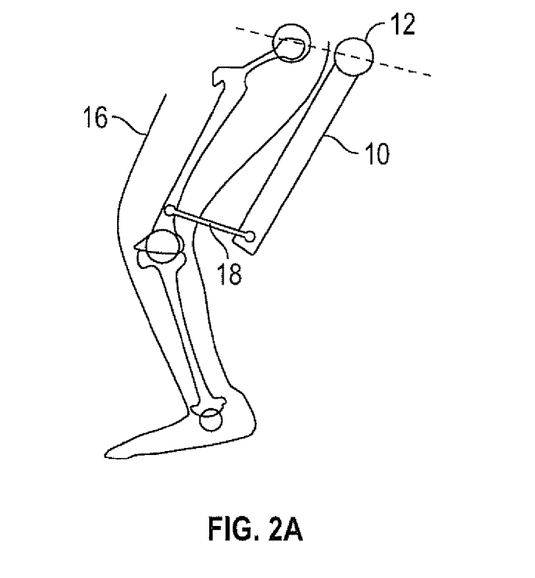
FIG. 2A and FIG. 2B show representations of an exemplary one degree-of-freedom (1-DOF) coupled human-exoskeleton system with rigid coupling (FIG. 2A) and soft coupling (FIG. 2B) in accordance with one aspect of the present application.
Figure 2B:
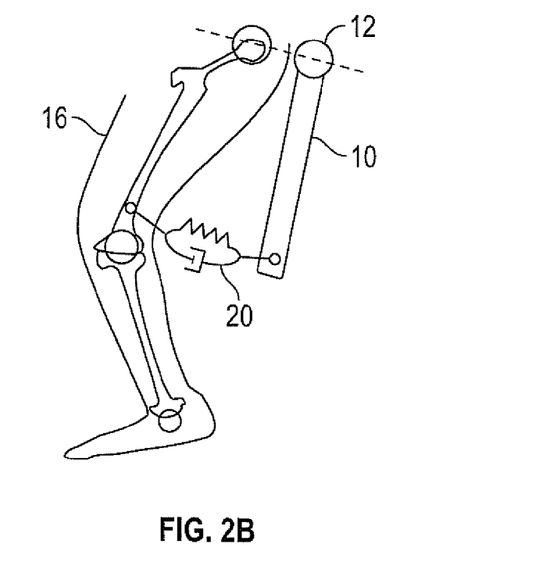

Referring now to the figures, FIG. 1 shows an embodiment of a Stride Management Assist (SMA) exoskeleton device 10 in accordance with embodiments of the invention. The SMA device 10 may have two 1-DOF hip joints 12. In the embodiment shown, a torso support 14 may be added to the SMA device 10 to provide greater damping and to reduce oscillations. The coupling between an exoskeleton and a human limb 16 may play a critical role in determining the performance of the exoskeleton 10, and the coupling may be either rigid 18 or soft 20 as shown in FIGS. 2A-2B and in FIG. 3. In the case of rigid coupling 18 as shown in FIG. 2A, there may be no relative motion between the human limb 16 and the exoskeleton 10, whereas in the case of soft coupling 20 in FIG. 2B, the human limb 16 and the exoskeleton 10 may move relative to each other. In actual implementations of an exoskeleton attached to a limb there may be a soft coupling due to muscle, skin tissue, fat layers, and other body substances between the bone and the exoskeleton device. The soft couple may be modeled in embodiments with a linear torsional spring with a coefficient $k_c$ and a linear torsional damper with coefficient $b_c$ as shown in FIG. 3.

Figure 3:
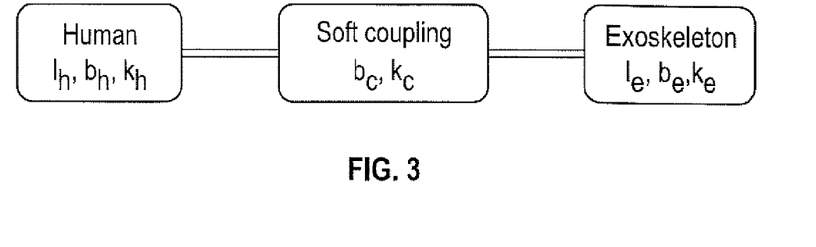
FIG. 3 is a block diagram summarizing equations for the 1-DOF coupled human-exoskeleton system with rigid coupling and soft coupling in accordance with one aspect of the present application.

As shown in FIG. 3, a coupled human-exoskeleton system with soft coupling may be modeled with second-order linear models to represent the joint dynamics of a human as shown in Equation 1 below, and the exoskeleton in Equation 2. The moment of inertia, joint damping and joint stiffness of the 1-DOF human joint may be given by $I_h$, $b_h$, $k_h$ respectively, and that for the exoskeleton may be given by $\{I_e, b_e, k_e\}$. The coupling damping and stiffness coefficients may be given by $b_c$, $k_c$, respectively.

The linear equations of motion of an isolated 1-DOF human joint of an exemplary embodiment of the disclosure may be given by $$I_h\ddot{\theta}_h(t)+b_h\dot{\theta}_h(t)+k_h\theta_h(t)=\tau_h(t), \quad (1)$$

Where $\theta_h(t)$ is the joint angle trajectory, $I_h$, $b_h$, $k_h$ is the associated moment of inertia, joint damping coefficient and joint stiffness coefficient respectively, and $\tau_h(t)$ is the joint torque trajectory. The stiffness term $k_h\theta_h(t)$ may include the linearized gravitational terms. Similarly, the linear equations of motion of an isolated 1-DOF exoskeleton may be given by:

$$I_e\ddot{\theta}_e(t)+b_e\dot{\theta}_e(t)+k_e\theta_e(t)=\tau_e(t), \quad (2)$$

where $\theta_e(t)$ is the joint angle trajectory, $I_e$, $b_e$, $k_e$ is the associated moment of inertia, joint damping coefficient and joint stiffness coefficient respectively, and $\tau_h(t)$ is the joint torque trajectory.

The linear equations of motion of a coupled human exoskeleton system with soft coupling may be given by:

$$I_h\ddot{\theta}_h(t)+b_h\dot{\theta}_h(t)+k_h\theta_h(t)=\tau_h(t)-\tau_c(t), \quad (3)$$

$$I_e\ddot{\theta}_e(t)+b_e\dot{\theta}_e(t)+k_e\theta_e(t)=\tau_e(t)+\tau_c(t), \quad (4)$$

where $\tau_c$ is the coupling joint torque given by:

$$\tau_c(t)=b_c(\dot{\theta}_h(t)-\dot{\theta}_e(t))+k_c(\theta_h(t)-\theta_e(t)). \quad (5)$$

For the linear human joint dynamics in Equation (1), the impedance (N. Hogan and S. O. Buerger, Impedance and Interaction Control, Robotics and Automation Handbook. CRC Press, LLC., 2005, ch. 19) transfer function $Z_h(s)$ may be given by $$Z_h(s)=\frac{\tau_h(s)}{\Omega_h(s)}=\frac{I_hs^2+b_hs+k_h}{s}, \quad (6)$$

and the admittance (N. Hogan and S. O. Buerger, Impedance and Interaction Control, Robotics and Automation Handbook. CRC Press, LLC., 2005, ch. 19) transfer function $Y_h(s)$ may be given by:

$$Y_h(s)=\frac{\Omega_h(s)}{\tau_h(s)}=\frac{s}{I_hs^2+b_hs+k_h}, \quad (7)$$

where $\Omega_h(s)$ is the Laplace transform of $\ddot{\theta}_h(t)$, and $\tau_h(s)$ is the Laplance transform of $\tau_h(t)$. For a linear system, its impedance may be the inverse of its admittance and vice-versa, as it can be seen in Equations 6-7.

The integral admittance transfer function $X_h(s)$ may be defined as the integral of the admittance transfer function and may be given by:

$$X_h(s)=\frac{\Theta_h(s)}{\tau_h(s)}=\frac{1}{I_hs^2+b_hs+k_h}, \quad (8)$$

where $\Theta_h(s)$ is the Laplace transform of $\theta_h(t)$. The admittance $Y_h(s)$ maps torque to angular velocity, while the integral admittance $X_h(s)$ maps torque to angle. The integral admittance may be used extensively in the further sections of this disclosure.

In embodiments described in this disclosure the human joint, exoskeleton, and coupling element may be treated as three isolated systems, and their corresponding impedance and admittance transfer functions may be written as follows. The admittance transfer function of an isolated human joint $Y_h(s)$ may be given by Equation 7, while the admittance transfer function of an isolated exoskeleton $Y_e(s)$ may be given by:

$$Y_e(s) = \frac{\Omega_e(s)}{\tau_e(s)} = \frac{s}{I_e s^2 + b_e s + k_e}, \quad (9)$$

and the impedance transfer function of an isolated coupling element $Z_c(s)$ may be given by:

$$Z_c(s) = \frac{\tau_c(s)}{\Omega_c(s)} = \frac{b_c s + k_e}{s}, \quad (10)$$

where $\Omega_c(s) = \Omega_h(s) - \Omega_e(s)$ is the Laplace transform of the angular velocity of the coupling element.

As disclosed herein exoskeleton controllers may be designed to modify the coupled system joint dynamics, i.e., the joint impedance, admittance, and integral admittance of the coupled human exoskeleton system. The following is a derivation of an embodiment of the closed-loop dynamics of a coupled human-exoskeleton system with an exoskeleton controller, and presents the coupled stability and passivity conditions.

Figure 4A:
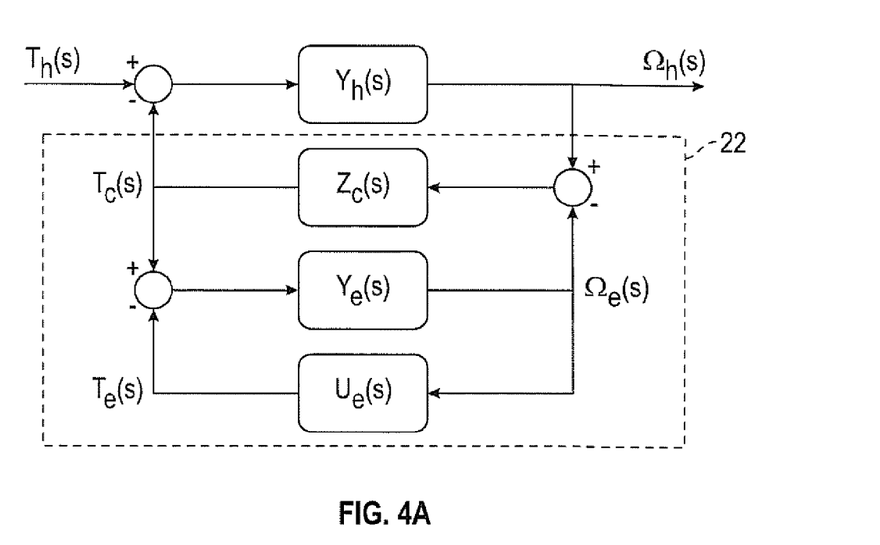
FIG. 4A and FIG. 4B are block diagrams of illustrative coupled human-exoskeleton systems with the exoskeleton controller $U_e(s)$ in accordance with one aspect of the present application.

For any exoskeleton control transfer function $U_e(s)$ that feeds back exoskeleton joint angular velocity transfer function $\Omega_e(s)$, the closed-loop coupled human-exoskeleton system may be represented as a block diagram in FIG. 4A. The analysis presented below may be applicable to any general exoskeleton controller $U_e(s)$, and the specific exoskeleton control structure used in this disclosure may be seen below.

Figure 4B:
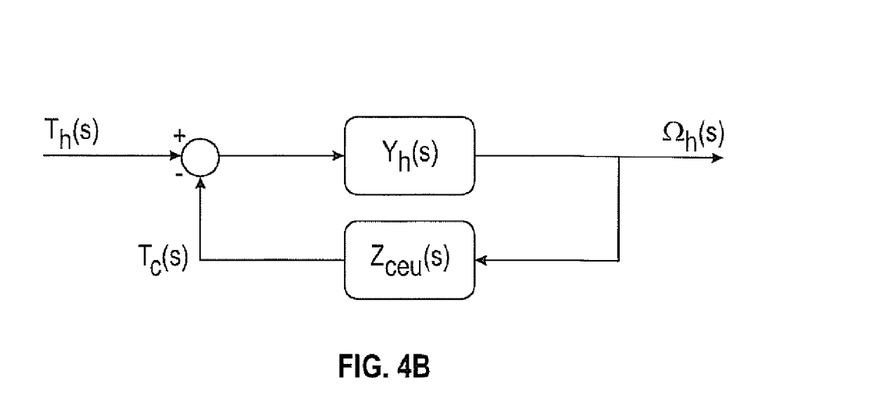

The outlined region 22 in FIG. 4A containing $Z_c(s)$, $Y_e(s)$ and $U_e(s)$ may be reduced to a single transfer function $Z_{ceu}(s)$ which may be given by:

$$Z_{ceu}(s) = \frac{Z_c(s)}{1 + Z_c(s)Y_{cu}(s)}, \quad (11)$$

as shown in FIG. 4B where $Y_{eu}(s)$ may be given by:

$$Y_{cu}(s) = \frac{Y_e(s)}{1 - Y_e(s)U_e(s)}. \quad (12)$$

The loop transfer function $L_{heu}(s)$ that may be needed to evaluate the stability of the feedback system shown in FIG. 4B may be given by:

$$L_{heu}(s) = Y_h(s)Z_{eus}(s), \quad (13)$$

and the feedback system gain margin GM may be given by:

$$GM(L_{heu}) = \frac{1}{|L_{heu}(j\omega_c)|}, \quad (14)$$

where $\omega_c$ is the phase-crossover frequency when the phase of $L_{heu}(s)$ is 180°, i.e., $\angle L_{heu}(j\omega_c) = 180°$. The gain margin $GM(L_{heu})$ may give the maximum positive gain exceeding when the closed-loop system becomes unstable. Therefore, in order for the coupled human-exoskeleton system shown in FIG. 4B to be stable, the following condition may generally needs to be satisfied:

$$GM(L_{heu}) > 1. \quad (15)$$

From FIG. 4B, the overall closed-loop admittance $Y_{heu}(s)$ of the coupled human-exoskeleton system with the exoskeleton controller $U_e(s)$ may be given by:

$$Y_{heu}(s) = \frac{Y_h(s)}{1 + Y_h(s)Z_{ceu}(s)}, \quad (16)$$

and the corresponding closed-loop integral admittance $X_{heu}(s)$ of the coupled human-exoskeleton system may be given by:

$$X_{heu}(s) = \frac{Y_{heu}(s)}{s} = \frac{X_h(s)}{1 + Y_h(s)Z_{ceu}(s)}, \quad (17)$$

where $X_h(s) = Y_h(s)/s$ as shown in Equation 8. It should be noted that the natural human joint dynamics of a second-order may be shown in Equation 1, while the coupled human-exoskeleton joint dynamics shown in Equation 3-5 is of a fourth-order. However, with high coupling stiffness and damping, the coupled system dynamics may be predominantly of a second-order. The order of the closed-loop coupled system may depend on the order of the exoskeleton controller $U_e(s)$.

In addition to coupled stability, an important requirement for dynamically interacting systems may be coupled passivity (J. E. Colgate, "The control of dynamically interacting systems," Ph.D. dissertation, Massachusetts Institute of Technology, Cambridge, Mass., 1988). Coupled passivity may ensure that the coupled human-exoskeleton system does not become unstable when in contact with any passive environment (J. E. Colgate and N. Hogan, "An analysis of contact instability in terms of passive physical equivalents," in *Proc. IEEE Int. Conf. Robotics and Automation (ICRA)*, 1989, pp. 404-409). A linear time-invariant system may be said to be passive (J. E. Colgate, "The control of dynamically interacting systems," Ph.D. dissertation, Massachusetts Institute of Technology, Cambridge, Mass., 1988) when the impedance transfer function $Z(s)$ satisfies the following conditions:

1) $Z(s)$ has no poles in the right-hand half of the complex plane; and

2) $Z(s)$ has a Nyquist plot that lies wholly in the right-hand half of the complex.

The first condition generally requires $Z(s)$ to be stable, while the second condition generally requires the phase of $Z(s)$ to lie within −90° and 90° for all frequencies (J. E. Colgate, "The control of dynamically interacting systems," Ph.D. dissertation, Massachusetts Institute of Technology, Cambridge, Mass., 1988), i.e., $\angle Z(j\omega) \in [-90°, 90°]$. This, in turn, may enforce that the phase of the system admittance $\angle Y(j\omega) \in [-90°, 90°]$ and the phase of the system integral admittance $\angle X(j\omega) \in [-180°, 0°]$.

Therefore, in order for a stable coupled human-exoskeleton system satisfying Equation 15 to be passive, the following condition may need to be satisfied:

$$\angle X_{heu}(j\omega) \in [-180°, 0°] \forall \omega. \quad (18)$$

A novel control design framework may be disclosed below that may shape the frequency response magnitude of the closed-loop integral admittance $X_{heu}(s)$ of the coupled human exoskeleton system in Equation 17 such that the 1-DOF human joint motion may be resisted. In this framework, the magnitude may be chosen for shaping the integral admittance profile, while the phase may be used to evaluate the passivity of the coupled system.

In order to design the shape of $|X_{heu}(j\omega)|$, an objective for the exoskeleton may need to be defined. In an exemplary embodiment, an objective may be to provide resistance and avoid assistance. In order to define the shape of $|X_{heu}(j\omega)|$ that provides resistance and avoids assistance, the resistance and assistance may need to be defined in a clear and quantitative way. Below, presents conceptual and quantitative definitions of resistance and assistance using the frequency response magnitude of the integral admittance, followed by a description of the desired characteristics of a resistive exoskeleton, and a constrained optimization formulation that shapes the closed-loop integral admittance such that the desired resistance is achieved, while guaranteeing coupled stability and passivity.

The following definitions for resistance and assistance may be use in accordance with embodiments of the disclosure. Definition 1: In an exemplary embodiment of the present disclosure a 1-DOF human joint may be said to be "resisted" by an exoskeleton if the frequency response magnitude of the integral admittance of the coupled human-exoskeleton system is lesser than that of the natural human for all frequencies of interest, i.e., $|X_{heu}(j\omega)|<|X_h(j\omega)|$, $\forall \omega \in [0, \omega_f]$ where $\omega_f$ is the upper bound for the frequencies of interest. When a joint is resisted as per Definition 1, the same joint torques may produce a joint motion whose amplitude is smaller than that of the natural joint, and is termed as motion reduction. On the other hand, the same joint motion may be achieved in the resisted joint with a torque profile whose amplitude is larger than that required for the natural joint. This may be termed as torque amplification.

Definition 2: A 1-DOF human joint may be said to be assisted by an exoskeleton if the frequency response magnitude of the integral admittance of the coupled human-exoskeleton system is greater than that of the natural human for all frequencies of interest, i.e., $|X_{heu}(j\omega)|>|X_h(j\omega)|$, $\forall \omega \in [0, \omega_f]$. Similar to motion reduction and torque amplification that result from resistance, assistance may produce their opposite effects, i.e., motion amplification and torque reduction.

Figure 5A:
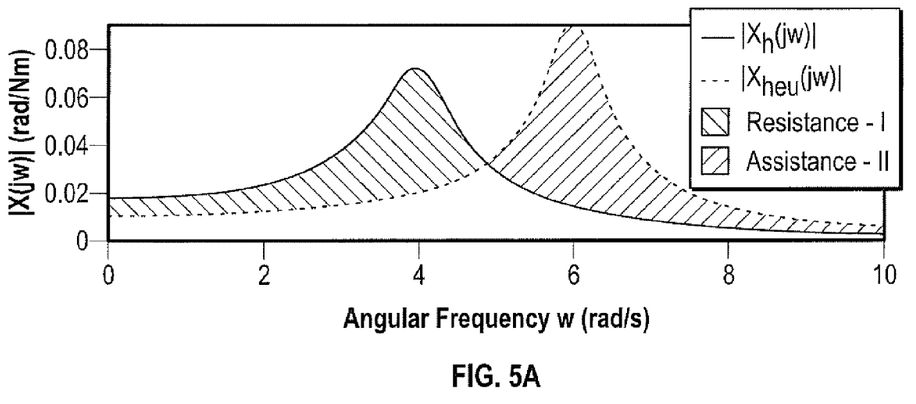
FIG. 5A is an illustrative graph of Assistance and Resistance of a 1-DOF assistive exoskeleton represented in terms of Integral Admittance $X(s)$ in accordance with one aspect of the present application.
Figure 5B:
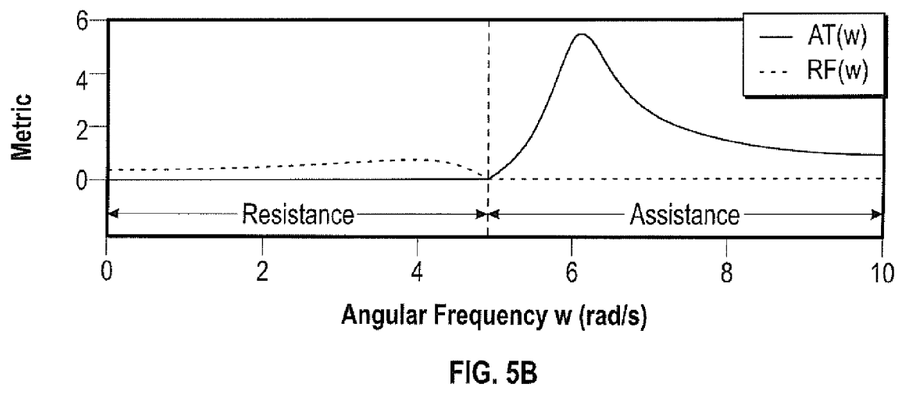
FIG. 5B is an illustrative graph of Assistance and Resistance of a 1-DOF assistive exoskeleton represented in terms of an assistance function $_A\mathcal{F}(\omega)$ and a resistance function $_R\mathcal{F}(\omega)$ in accordance with one aspect of the present application.

As may be seen in FIGS. 5A and 5B, plots of assistance and resistance of a 1-DOF assistive exoskeleton represented in terms of: (a) integral admittance X(s), and (b) assistance function AF(ω) and Resistance RF(ω). The magnitude of the frequency response of the integral admittance of a natural human joint may be denoted by $|X_h(j\omega)|$, and that of the closed-loop integral admittance of the coupled human-exoskeleton system may be denoted by $|X_{heu}(j\geq)|$.

As shown in FIG. 5A, a frequency response magnitude plot of a natural human and a hypothetical coupled human exoskeleton system whose parameters are listed in Table 1 may be seen. As per definitions 1 and 2 above, region I may represent the frequencies where there is resistance, i.e., $|X_{heu}(j\omega)|<|X_h(j\omega)|$, and region II may represent the frequencies where there is assistance, i.e., $|X_{heu}(j\omega)|>|X_h(j\omega)|$.

FIG. 5B shows that at each frequency ω, the exoskeleton behavior may be either resistive or assistive. Based on this observation, the resistance function RF(ω) may be defined as $$\mathcal{RF}(\omega) = \begin{cases} 0 & \text{if } |X_{heu}(j\omega)| \geq |X_h(j\omega)| \\ \frac{|X_h(j\omega)| - |X_{heu}(j\omega)|}{|X_h(j\omega)|} & \text{if } |X_{heu}(j\omega)| < |X_h(j\omega)| \end{cases} \quad (19)$$

and the assistance function AF(ω) may be defined as:

$$\mathcal{AF}(\omega) = \begin{cases} \frac{|X_{heu}(j\omega)| - |X_h(j\omega)|}{|X_h(j\omega)|} & \text{if } |X_{heu}(j\omega)| \geq |X_h(j\omega)| \\ 0 & \text{if } |X_{heu}(j\omega)| < |X_h(j\omega)| \end{cases} \quad (20)$$

At any frequency ω, the resistance function RF(ω)∈[0,1], and the assistance function AF(ω)∈[0, ∞]. When the coupled human-exoskeleton joint dynamics may be identical to the natural human joint dynamics, i.e., $|X_{heu}(j\omega)|=|X_h(j\omega)|$, then $\mathcal{RF}(\omega) =_\mathcal{A} \mathcal{F}(\omega)=0$, $\forall \omega$. The upper bound RF(ω)=1 is achieved when $|X_{heu}(j\omega)|=0$, and the upper bound AF(ω)=∞ may be achieved when $|X_{heu}(j\omega)|=1$. Although both these cases are mathematically valid, these cases are generally not realistic.

In specific embodiments of the disclosure, it may be important to note that the exoskeleton may either only resist or only assist at any particular frequency ω for a single joint, which may be seen from FIG. 5A. Using the resistance function RF(ω) and the assistance function AF(ω), the following quantitative metrics for resistance and assistance of a 1-DOF assistive exoskeleton, namely resistance ratio and assistance ratio may be defined.

Definition 3: Resistance Ratio R may be defined as the average value of the resistance function RF(ω) over a range of frequencies [0, $\omega_f$] and may be given by:

$$\mathcal{R} = \frac{1}{\omega_f} \int_0^{\omega_f} \mathcal{RF}(\omega) d\omega. \quad (21)$$

Definition 4: Assistance Ratio A may be defined as the average value of the assistance function AF(ω) over a range of frequencies [0, $\omega_f$], and may be given by:

$$\mathcal{A} = \frac{1}{\omega_f} \int_0^{\omega_f} \mathcal{AF}(\omega) d\omega. \quad (22)$$

Similar to the resistance and assistance functions, the resistance ratio R∈[0, 1] and the assistance ratio A∈[0, ∞]. As described above, the upper bounds R=1 and A=∞ may be achieved only if $|X_{heu}(j\omega)|=\infty$ and $|Xa(j\omega)|=0$ respectively $\forall \omega$. Although these bounds may be mathematically valid, the bounds may not be realistic for any proper integral admittance transfer function. With the above definitions of resistance and assistance, the below section of may enumerate embodiments of desired characteristics of a resistive exoskeleton.

An objective of embodiments of the resistive exoskeleton may be to provide resistance to any human motion while not be assisting any motion. However, it may be vital to ensure that the coupled human-exoskeleton system is also stable. Furthermore, coupled passivity as defined in "The control of dynamically interacting systems," by J. E. Colgate (Ph.D. dissertation, Massachusetts Institute of Technology, Cambridge, Mass., 1988) may also be essential since coupled passivity may guarantee stability even when the coupled human-exoskeleton system interacts with any passive environment.

Therefore, the necessary desired characteristics of a 1-DOF resistive exoskeleton may be listed as follows:

1) Coupled Stability, i.e., $GM(L_{heu}) > 1$ (Eq. 15);
2) Coupled Passivity, i.e., $\angle X_{heu}(j\omega) \in [-180°, 0°]$, $\forall \omega$ (Eq. 18);
3) Positive Resistance, i.e. $\mathcal{R} > 0$ (Eq. 21); and
4) No Assistance, i.e. $\mathcal{A} = 0$ (Eq. 22).

The above characteristics may be the necessary desired characteristics of a 1-DOF resistive exoskeleton. However, more characteristics may be added to the list depending on the task and the desired goals of the exoskeleton implementation.

The preceding sections may have provided the metrics to evaluate resistance and enumerated the desired characteristics of a resistive exoskeleton. Now, embodiments of designs for an exoskeleton controller $U_e(s)$ that shapes the closed-loop integral admittance of the coupled human-exoskeleton system based on these metrics may be disclosed below.

Any exoskeleton control law for $\tau_e(t)$ may produce an exoskeleton dynamics given by Equation 4, and hence given a desired exoskeleton dynamics, one can derive a corresponding controller. If the desired exoskeleton dynamics may be given by a desired moment of inertia $I_e^d$, a desired joint damping coefficient $b_e^d$ and a desired joint stiffness coefficient $k_e^d$, then the exoskeleton torque $\tau_e$ required to achieve the desired exoskeleton dynamics may be given by $$\tau_e(t) = (I_e - I_e^d)\ddot{\theta}_e(t) + (b_e - b_e^d)\dot{\theta}_e(t) + (k_e - k_e^d)\theta_e(t). \quad (23)$$

It can be easily verified that the control law in Equation 23 may reduce the exoskeleton dynamics in Equation 2 to:

$$I_e^d \ddot{\theta}_e(t) + b_e^d \dot{\theta}_e(t) + k_e^d \theta_e(t) = 0, \quad (24)$$

as desired. The exoskeleton controller $U_e(s)$ corresponding to the control law in Equation 23 that feeds back angular velocity $\omega_e(s)$ may be given by:

$$U_e(s) = \frac{K_\alpha s^2 + K_\omega s + K_\theta}{s}, \quad (25)$$

where $K_\alpha = I_e - I_e^d$, $K_\omega = b_e - b_e^d$, and $K_\theta = k_e - k_e^d$ are the feedback gains on angular acceleration $\ddot{\theta}_e$, angular velocity $\dot{\theta}_e$ and angle $\theta_e$ respectively.

The control transfer function $U_e(s)$ shown in Equation 25 may be characterized by three control parameters, namely, $K_\theta$, $K_\omega$, and $K_\alpha$. These parameters may affect the closed-loop integral admittance $X_{heu}(s)$, and they may be chosen such that the frequency response magnitude of the closed-loop integral admittance $X_{heu}(s)$ may be shaped such that the desired resistance $\mathcal{R}_d$ is achieved.

Given a desired resistance ratio $\mathcal{R}_d$, an optimal set of control parameters of the 1-DOF coupled human-exoskeleton system in Equation 17 may be obtained using the following constrained optimization problem:

$$\underset{\{K_\theta, K_\omega, K_\alpha, \omega_{lo}\}}{\text{minimize}} |\mathcal{R} - \mathcal{R}_d|^2 \quad (26)$$

subject to $GM(L_{heu}) > 1$, $$\frac{\angle X_{heu}(j\omega)}{\mathcal{A} = 0.} \in [-180°, 0°] \; \forall \, \omega,$$

Figure 6A:
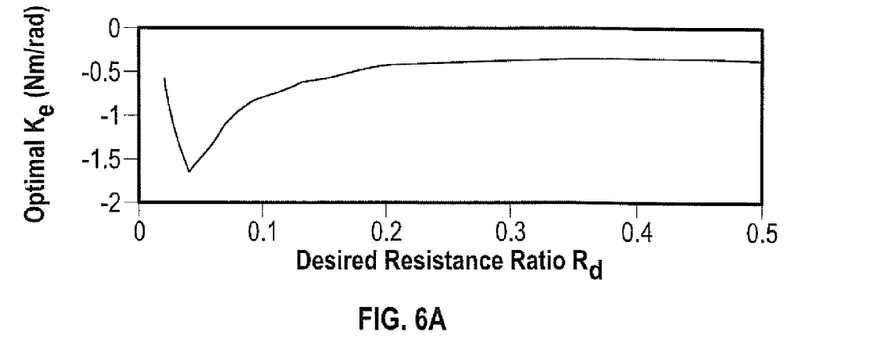
FIGS. 6A-6C are illustrative graphs showing derived control parameters for different desired resistance ratios $\mathcal{R}_d$ with the coupled stability, passivity, and zero assistance constraints in accordance with one aspect of the present application.
Figure 6B:
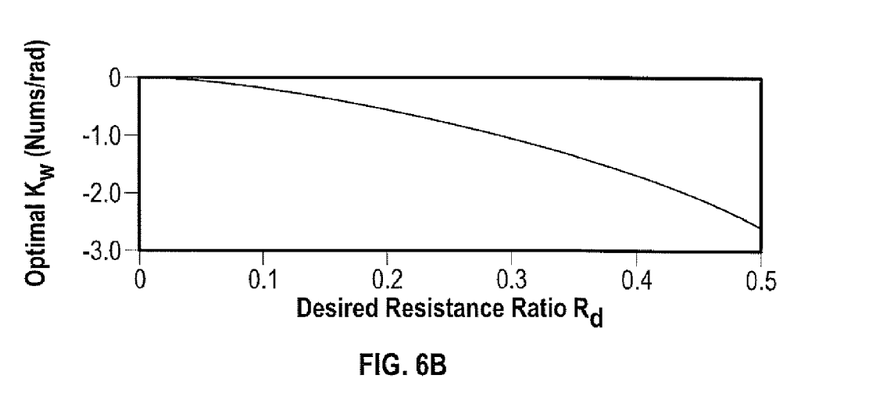
Figure 6C:
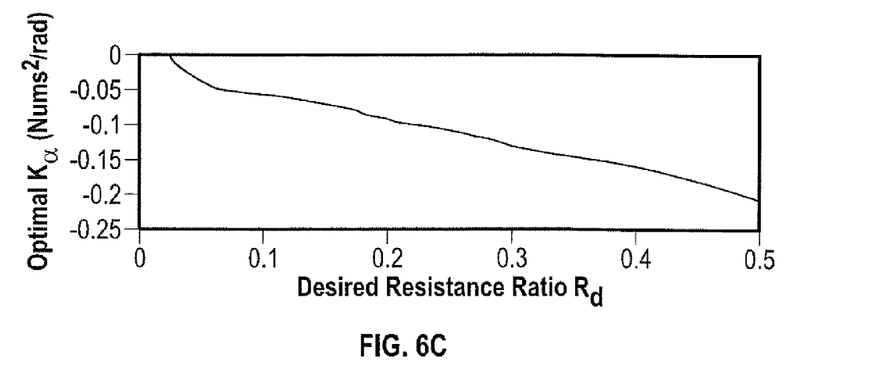
Figure 7:
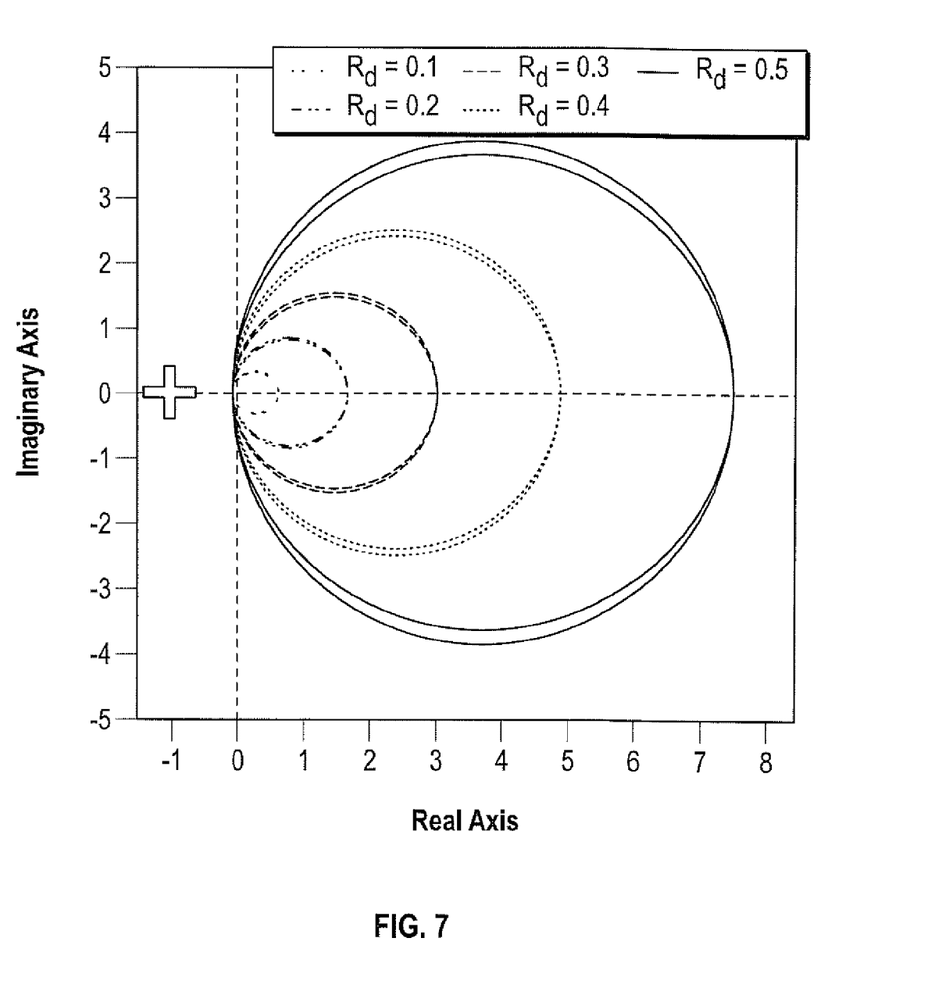
FIG. 7 shows an illustrative series of Nyquist plots of $L_{heu}(s)$ for the control parameters in FIGS. 6(a)-6(c) that achieve both coupled stability and passivity in accordance with one aspect of the present application.
Figure 8A:
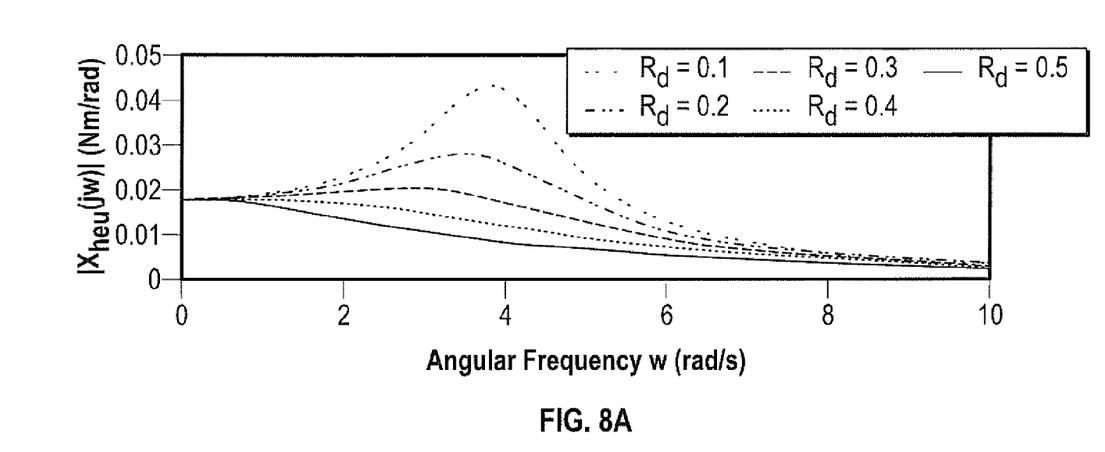
FIG. 8A and FIG. 8B are illustrative integral admittance magnitude and phase plots for derived coupled human-exoskeleton systems in accordance with one aspect of the present application.
Figure 8B:
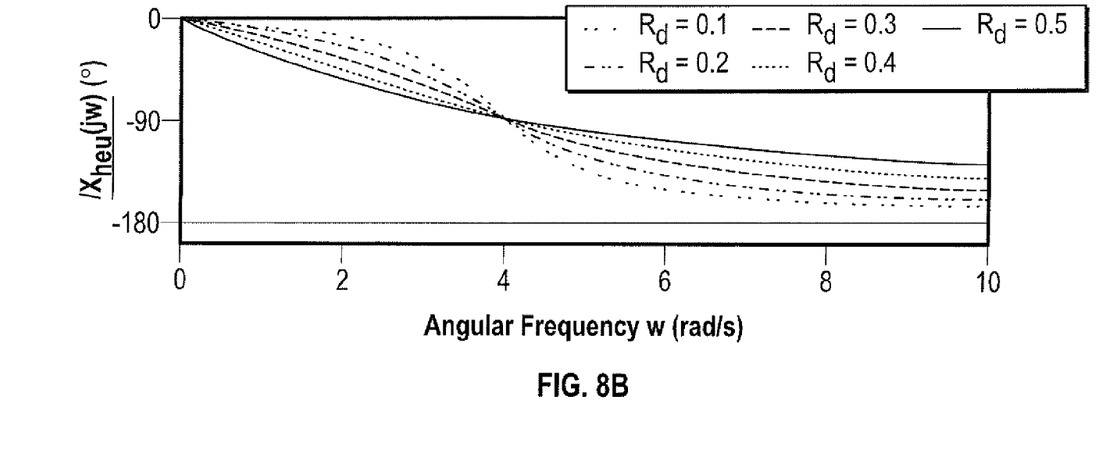

FIGS. 6A-6C illustrate the derived optimal control parameters for the different desired resistance ratios $\mathcal{R}_d$ with the coupled stability, passivity and zero assistance constraints. The passive exoskeleton without any resistive control already resulted in a resistance ratio of $\mathcal{R} = 0.0177$, and hence the optimization results in FIG. 6 generally correspond to desired resistance ratio $\mathcal{R}_d \geq 0.02$ FIG. 7 shows a set of Nyquist plots of $L_{heu}(s)$ corresponding to some of the optimal control parameters shown in FIG. 6 that achieve both coupled stability and passivity. None of the Nyquist plots encircle $-1+j0$, indicating stable coupled human-exoskeleton systems. The integral admittance magnitude and phase plots of some of the derived coupled human-exoskeleton systems may be shown in FIGS. 8(a) and 8(b). It may be seen from FIG. 8(b) that the coupled systems, whose phase plots are shown satisfy the passivity condition in Equation 18, i.e., $\angle X_{heu}(j\omega) \in [-180°, 0°]$, $\forall \omega$. Thus, these embodiments of the coupled human-exoskeleton system with optimal control parameters that achieve coupled stability and passivity for FIG. 8(a) with integral admittance magnitude $|X_{heu}(j\omega)|$, and for FIG. 8(b) with integral admittance phase $\angle X_{heu}$.

Figure 9:
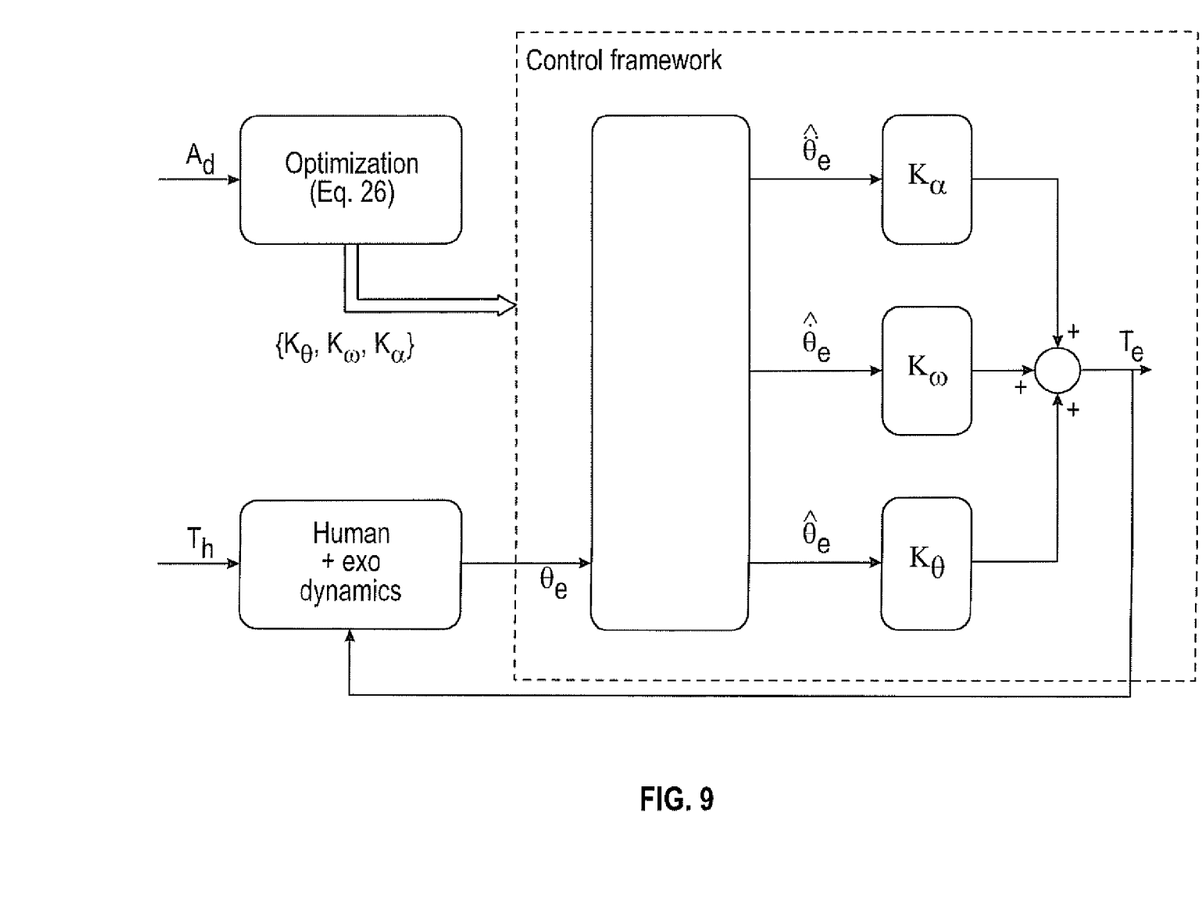
FIG. 9 is an illustrative functional block diagram of an exemplary framework used for resistive exoskeleton control in accordance with one aspect of the present application.

FIG. 9 is a functional block of an embodiment of a control framework that executes the resistive exoskeleton controller using the optimal parameters from Equation 26. As shown in FIG. 9, a Kalman filter may be used to estimate the exoskeleton joint angle $\hat{\theta}_e$, angular velocity $\hat{\dot{\theta}}_e$ and angular acceleration $\hat{\ddot{\theta}}_e$ that may be needed to implement the control law in Equation 25. Embodiments of the online Kalman filter implementation may be based on filter models found in "Kalman filter estimation of angular velocity and acceleration: On-line implementation," by P. Canet (McGill University, Montreal, Canada, Tech. Rep. TR-CIM-94-15, November 1994).

While embodiments of the disclosure have been described in terms of various specific embodiments, those skilled in the art will recognize that the embodiments of the disclosure may be practiced with modifications within the spirit and scope of the claims.

What is claimed is:

1. A resistive exoskeleton control system comprising:
   a controller configured to:
   generate a positive resistance by shaping a closed loop integral admittance of an exoskeleton system coupled to a human, wherein a frequency response magnitude of the closed loop integral admittance is lower than that of a natural human joint over desired frequencies of interest;
   generate an assistance ratio of approximately zero over the desired frequencies of interest, wherein the assistance ratio is defined by $$\mathcal{A} = \frac{1}{\omega_f} \int_0^{\omega_f} \mathcal{AF}(\omega) d\omega,$$

wherein $$\mathcal{AF}(\omega) = \begin{cases} \dfrac{|X_{heu}(j\omega)| - |X_h(j\omega)|}{|X_h(j\omega)|} & \text{if } |X_{heu}(j\omega)| \geq |X_h(j\omega)| \\ 0 & \text{if } |X_{heu}(j\omega)| < |X_h(j\omega)| \end{cases},$$

where $X_h(j\omega)$ is the integral admittance of a human joint and $X_{heu}(j\omega)$ is the integral admittance of the exoskeleton system coupled to the human; and
control the exoskeleton system based on the positive resistance and the assistance ratio.

2. The resistive exoskeleton control system of claim 1, wherein the controller is further configured to generate a loop transfer function having a gain margin greater than 1.

3. The resistive exoskeleton control system of claim 1, wherein the controller has coupled passivity.

4. The resistive exoskeleton control system of claim 3, wherein a phase of the closed loop integral admittance is defined by $\angle X_{heu}(j\omega) \in [-180°, 0°] \; \forall \omega$.

5. The resistive exoskeleton control system of claim 1, wherein the controller is further configured to generate a control transfer function defined by $$U_e(s) = \frac{K_\alpha s^2 + K_\omega s + K_\theta}{s},$$

wherein $K_\alpha = I_e - I_e^d$, $K_\omega = b_e - b_e^d$, and $K_\theta = k_e - k_e^d$ are the feedback gains on angular acceleration $\ddot{\theta}_e$, angular velocity $\dot{\theta}_e$ and angle $\theta_e$ of an exoskeleton device.

6. The resistive exoskeleton control system of claim 1, wherein the controller is further configured to generate a positive resistance ratio over the desired frequencies of interest, wherein the positive resistance ratio is defined by $$\mathcal{R} = \frac{1}{\omega_f} \int_0^{\omega_f} \mathcal{RF}(\omega) d\omega, \quad \text{wherein}$$

$$\mathcal{RF}(\omega) = \begin{cases} 0 & \text{if } |X_{heu}(j\omega)| \geq |X_h(j\omega)| \\ \frac{|X_h(j\omega)| - |X_{heu}(j\omega)|}{|X_h(j\omega)|} & \text{if } |X_{heu}(j\omega)| < |X_h(j\omega)| \end{cases},$$

where $X_h(j\omega)$ is the integral admittance of a human joint and $X_{heu}(j\omega)$ is the integral admittance of the exoskeleton system coupled to the human.

7. A resistive exoskeleton control system comprising:
a controller configured to:
shape a closed loop integral admittance of an exoskeleton system coupled to a human, wherein a frequency response magnitude of the closed loop integral admittance is lower than that of a natural human joint;
generate an assistance ratio of approximately zero for desired frequencies of interest, wherein the controller is stable and passive;
generate a positive resistance ratio over the desired frequencies of interest, wherein the positive resistance ratio is defined by $$\mathcal{R} = \frac{1}{\omega_f} \int_0^{\omega_f} \mathcal{RF}(\omega) d\omega,$$

wherein $$\mathcal{R} = \frac{1}{\omega_f} \int_0^{\omega_f} \mathcal{RF}(\omega) d\omega, \quad \text{wherein}$$

$$\mathcal{RF}(\omega) = \begin{cases} 0 & \text{if } |X_{heu}(j\omega)| \geq |X_h(j\omega)| \\ \frac{|X_h(j\omega)| - |X_{heu}(j\omega)|}{|X_h(j\omega)|} & \text{if } |X_{heu}(j\omega)| < |X_h(j\omega)| \end{cases},$$

where $X_h(j\omega)$ is the integral admittance of a human joint and $X_{heu}(j\omega)$ is the integral admittance of the exoskeleton system coupled to the human; and control the exoskeleton system based on the positive resistance and the assistance ratio.

8. The resistive exoskeleton control system of claim 7, wherein the controller is further configured to generate a loop transfer function having a gain margin greater than 1.

9. The resistive exoskeleton control system of claim 7, wherein a phase of the closed loop integral admittance is defined by $\angle X_{hue}(j\omega) \in [-180°, 0°] \; \forall \omega$.

10. The resistive exoskeleton control system of claim 7, wherein the controller is further configured to generate a control transfer function defined by $$U_e(s) = \frac{K_\alpha s^2 + K_\omega s + K_\theta}{s},$$

wherein $K_\alpha = I_e - I_e^d$, $K_\omega = b_e - b_e^d$, and $K_\theta = k_e - k_e^d$ are the feedback gains on angular acceleration $\ddot{\theta}_e$, angular velocity $\dot{\theta}_e$ and angle $\theta_e$ of an exoskeleton device.

11. The resistive exoskeleton control system of claim 7, wherein the assistance ratio is defined by $$\mathcal{A} = \frac{1}{\omega_f} \int_0^{\omega_f} \mathcal{AF}(\omega) d\omega,$$

wherein $$\mathcal{A} = \frac{1}{\omega_f} \int_0^{\omega_f} \mathcal{AF}(\omega) d\omega, \quad \text{wherein}$$

$$\mathcal{AF}(\omega) = \begin{cases} \frac{|X_{heu}(j\omega)| - |X_h(j\omega)|}{|X_h(j\omega)|} & \text{if } |X_{heu}(j\omega)| \geq |X_h(j\omega)| \\ 0 & \text{if } |X_{heu}(j\omega)| < |X_h(j\omega)| \end{cases},$$

where $X_h(j\omega)$ is the integral admittance of a human joint and $X_{heu}(j\omega)$ is the integral admittance of the exoskeleton system coupled to the human.

12. An exoskeleton control system comprising:
a controller configured to:
generate a positive resistance and an assistance ratio of approximately zero by shaping a closed loop integral admittance of an exoskeleton system coupled to a human over a desired frequency range, wherein the controller is stable and passive;
generate a control transfer function defined by $$U_e(s) = \frac{K_\alpha s^2 + K_\omega s + K_\theta}{s},$$

wherein $K_\alpha = I_e - I_e^d$, $K_\omega = b_e - b_e^d$, and $K_\theta = k_e - k_e^d$ are the feedback gains on angular acceleration $\ddot{\theta}_e$, angular velocity $\dot{\theta}_e$ and angle $\theta_e$ of an exoskeleton device; and
control the exoskeleton system based on the positive resistance, the assistance ratio, and the control transfer function.

13. The exoskeleton control system of claim 12, wherein a frequency response magnitude of the closed loop integral admittance is lower than that of a natural human joint over the desired frequency range.

14. The resistive exoskeleton control system of claim 12, wherein the controller is further configured to generate a loop transfer function having a gain margin greater than 1.

15. The resistive exoskeleton control system of claim 12, wherein a phase of the closed loop integral admittance is defined by $\angle X_{heu}(j\omega) \in [-180°, 0°] \ \forall \omega$.

16. The resistive exoskeleton control system of claim 12, wherein the positive resistance ratio is defined by $$\mathcal{R} = \frac{1}{\omega_f} \int_0^{\omega_f} \mathcal{RF}(\omega) d\omega \text{ wherein}$$

$$\mathcal{RF}(\omega) = \begin{cases} 0 & \text{if } |X_{heu}(j\omega)| \geq |X_h(j\omega)| \\ \frac{|X_h(j\omega)| - |X_{heu}(j\omega)|}{|X_h(j\omega)|} & \text{if } |X_{heu}(j\omega)| < |X_h(j\omega)| \end{cases},$$

where $X_h(j\omega)$ is the integral admittance of a human joint and $X_{heu}(j\omega)$ is the integral admittance of the exoskeleton system coupled to the human.

17. The resistive exoskeleton control system of claim 12, wherein the assistance ratio is defined by $$\mathcal{A} = \frac{1}{\omega_f} \int_0^{\omega_f} \mathcal{AF}(\omega) d\omega,$$

wherein $$\mathcal{A} = \frac{1}{\omega_f} \int_0^{\omega_f} \mathcal{AF}(\omega) d\omega, \quad \text{wherein}$$

$$\mathcal{AF}(\omega) = \begin{cases} \frac{|X_{heu}(j\omega)| - |X_h(j\omega)|}{|X_h(j\omega)|} & \text{if } |X_{heu}(j\omega)| \geq |X_h(j\omega)| \\ 0 & \text{if } |X_{heu}(j\omega)| < |X_h(j\omega)| \end{cases},$$

where $X_h(j\omega)$ is the integral admittance of a human joint and $X_{heu}(j\omega)$ is the integral admittance of a coupled human-exoskeleton system.

* * * * *